US008132637B1

(12) United States Patent
Watkins et al.

(10) Patent No.: US 8,132,637 B1
(45) Date of Patent: Mar. 13, 2012

(54) OFF-ROAD CAPABLE ELECTRIC WHEELCHAIR ATTACHMENT

(75) Inventors: Travis Watkins, West Melbourne, FL (US); Robert Burn, Tampa, FL (US); John Hopkins, St. Petersburg, FL (US)

(73) Assignee: University Of South Florida, Tampa, FL (US)

( * ) Notice: Subject to any disclaimer, the term of this patent is extended or adjusted under 35 U.S.C. 154(b) by 0 days.

(21) Appl. No.: 12/886,089

(22) Filed: Sep. 20, 2010

Related U.S. Application Data

(63) Continuation-in-part of application No. 11/381,027, filed on May 1, 2006, now Pat. No. 7,815,004.

(60) Provisional application No. 60/676,485, filed on Apr. 29, 2005.

(51) Int. Cl.
*B60P 3/06* (2006.01)

(52) U.S. Cl. .......................................................... 180/198

(58) Field of Classification Search .................. 180/198
See application file for complete search history.

(56) References Cited

U.S. PATENT DOCUMENTS

| | | | | |
|---|---|---|---|---|
| 1,356,473 | A * | 10/1920 | Schofield | 180/198 |
| 1,356,474 | A * | 10/1920 | Schofield | 180/198 |
| 1,356,475 | A * | 10/1920 | Schofield | 180/198 |
| 1,371,819 | A * | 3/1921 | Smith | 180/198 |
| 2,309,198 | A * | 1/1943 | McCleneghan | 414/537 |
| 3,195,664 | A * | 7/1965 | Friesen | 180/198 |
| 3,926,272 | A * | 12/1975 | Weber | 180/198 |
| 5,072,805 | A * | 12/1991 | Meiners | 180/198 |
| 6,101,953 | A * | 8/2000 | Spata | 105/215.2 |
| 6,412,582 | B1 * | 7/2002 | Leavitt | 180/182 |
| 6,604,590 | B2 | 8/2003 | Foulk, Jr. | |
| 6,659,214 | B1 * | 12/2003 | Laing | 180/198 |

* cited by examiner

*Primary Examiner* — Paul N Dickson
*Assistant Examiner* — Wesley Potter
(74) *Attorney, Agent, or Firm* — Jeremy Spier; Anton J. Hopen; Smith & Hopen, P.A.

(57) ABSTRACT

An attachment for an electric wheelchair that enables the electric wheelchair to be used in areas that would not otherwise be possible, e.g., beaches, mud, and tall grass. The attachment is powered off of the wheelchair's motor and allows the user to explore terrain that would not be possible in conventional wheelchair designs.

10 Claims, 10 Drawing Sheets

OFF-ROAD CAPABLE ELECTRIC WHEELCHAIR ATTACHMENT

CROSS REFERENCE TO RELATED APPLICATIONS

This application is a continuation-in-part of currently pending U.S. nonprovisional patent application Ser. No. 11/381,027, entitled "Off-Road Capable Electric Wheelchair Attachment," filed on May 1, 2006, which claims priority to U.S. provisional patent application No. 60/676,485, entitled, "Off-Road Capable Electric Wheelchair Attachment," filed on Apr. 29, 2005, the contents of which are herein incorporated by reference.

BACKGROUND OF THE INVENTION

1. Field of the Invention

This invention relates to vehicles for the handicapped. More specifically, it relates to attachments to motorized wheelchairs that enable users of motorized wheelchairs to navigate uneven terrain.

2. Description of the Prior Art

Wheelchairs are a required mode of transport for a large segment of society. Historically, wheelchairs were designed to be propelled by the user, based largely upon the application of force applied through the arms of the user to rotate the wheel. A significant advance in wheelchair design was achieved when the first motorized wheelchairs were developed a number of years ago. These advances allowed the users to cover greater distances, or in the case of users not having the ability in their arms required for locomotion, motorized/electric wheelchairs allowed users to use the wheelchairs in the first place. Even though many advances have been achieved in wheelchair design, many other needs remain unmet. The present invention seeks to solve some of these needs.

The standard electric wheelchair is designed to operate on hard, smooth, and relatively unvarying surfaces. When surfaces are encountered that do not adhere to these parameters, the typical wheelchair will not perform effectively or safely. Thus, users of wheelchairs often find themselves restricted to manmade environments or other very limited environments. It is our object to provide a system whereby a standard wheelchair can be adapted via an easily fitted attachment to function safely and effectively in a wide range of terrain. By greatly increasing the options of terrain open to the user of a standard wheelchair, we believe we can provide a great deal of mobility and enjoyment to the user of a wheelchair. It will be seen from the following disclosure that this objective is accomplished by the invention.

SUMMARY OF INVENTION

In accordance with the present invention there is provided an attachment apparatus for use with a motorized wheelchair. The apparatus includes a platform adapted to support a motorized wheelchair thereon, a pair of oversized wheels attached to the platform, and drive units attached to the platform and in communication with the oversized wheels. Each drive unit is adapted to receive force from the motorized wheelchair; the received force from the motorized wheelchair drives the drive units which turns one or more wheels in communication with the drive units. The drive units operate independently allowing the attachment apparatus to be steered by controlling the speed of each wheel separately.

In certain embodiments, the drive units use at least two rollers. The rollers are in rotatable communication with a drive wheel of the motorized wheelchair. The rotation of the drive wheel of the wheelchair causes rotation of the rollers which results in the rotation of an oversized wheel in communication with the drive unit. Multiple rollers may be used to accommodate varying sized wheelchairs.

In certain specific embodiments, the oversized wheels are wider than the wheels of a conventional motorized wheelchair whereby the wider wheel facilitates usage in soft terrain Likewise, the oversized wheels are of larger diameter than the wheels of a conventional motorized wheelchair whereby the larger diameter wheel facilitates usage over uneven soft terrain.

In certain specific embodiments, the apparatus includes an integrated ramp. The integrated ramp can be used to facilitate rolling the motorized wheelchair onto the wheelchair attachment. The integrated ramp includes a stowed position and an unstowed position.

In certain embodiments, the pair oversized wheels are attached to opposing sides of a forward position of the platform and further include one or more castors attached to the frame at a position behind the pair of oversized wheels. The platform includes a cover plate above the casters to provide support for a wheel of the wheelchair.

In certain embodiments, the attachment includes an anchoring unit to securely affix the attachment to the wheelchair. The anchoring unit limits the disengagement of the attachment from the chair in response to rough terrain.

In additional embodiments, the attachment includes a system of roll bars and guard bars. The roll bars and guard bars protect a user in the event the apparatus and attached wheelchair flip over.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Motorized or electric wheelchairs are generally designed to operate on smooth and even surfaces. A day at the beach or a stroll through the park grass, as simple as it may seem, is often out of the question for a person in a wheelchair. One limiting factor is often due to the design of the wheels of the wheelchair. The wheels are often relatively narrow, a design intended to minimize rolling resistance on smooth surfaces. A consequence of adopting a narrow wheel is that the wheelchair will tend to sink in soft terrain. Another issue with the wheels, especially on motorized chairs, is that the wheels are often of a relatively small diameter. This makes it especially difficult to roll over objects often encountered on uneven terrain. The off road capable motorized wheelchair attachment provides an innovative way of conquering new environments in an electric, or otherwise motorized, wheelchair. A user can simply roll their wheelchair up onto the wheelchair attachment and the terrain that the wheelchair can negotiate is greatly expanded.

By designing a drive system that works off of the electric wheelchair's power, the attachment can remain purely mechanical. With no motors or electric parts on the attachment, it is simple and straightforward. A user rolls onto the wheelchair attachment via an integrated ramp and secures the wheelchair into the locking mechanism.

Figure 1:
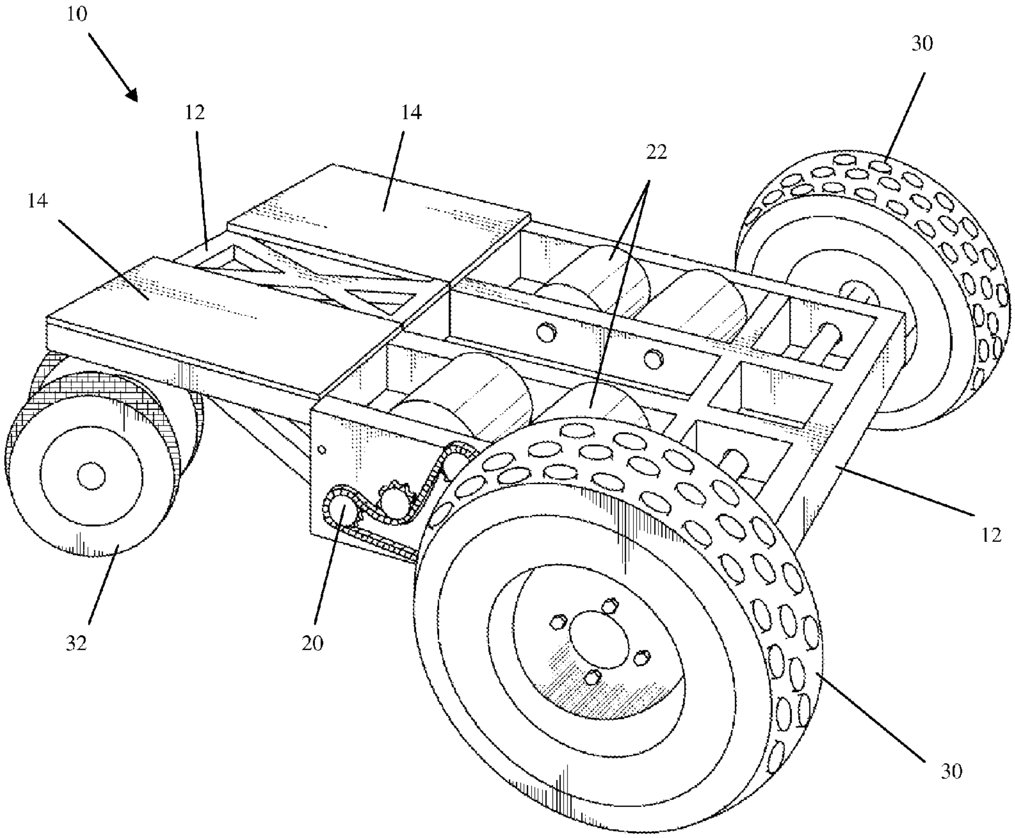
FIG. 1 is a perspective view of an embodiment of the wheelchair attachment.

With reference to FIG. 1, there is shown an off-road capable wheelchair attachment 10 in accordance with an embodiment of the present invention. The wheelchair attachment 10 has a platform 12 with top cover plates 14 that provides support for a wheelchair sitting on top of the wheelchair attachment. The wheelchair attachment has a pair of oversized wheels 30 rotatably attached to the platform. By "oversize wheels" it is meant that the wheels are larger in either width or in diameter than the wheels typically encountered in a conventional motorized wheelchair. The greater width of the wheels helps to prevent the wheelchair from sinking when negotiating soft grounds such as that found in sandy conditions. The added diameter of the wheels facilitates negotiating obstacles such as uneven ground and small rocks. The wheelchair attachment has a drive unit 20 attached to the platform 12 and in communication with the oversized wheels 30. One drive unit is found in association with each oversize wheel. Each drive unit has a pair of rollers 22, the rollers of each drive unit arranged parallel to one-another with reference to their axis of rotation and having a slight depression between the apex, or highpoint, of adjacent rollers. The wheelchair attachment also has a pair of auxiliary wheels 32 affixed to the platform 12 at a point aft or rearward of the oversized wheels 30. In FIG. 1 only one of the two auxiliary wheels is visible. The auxiliary wheels in the embodiment of FIG. 1 are mounted as casters with a dual tire arrangement. The casters are able to swivel in response to the turning motion of the wheelchair attachment.

Figure 2:
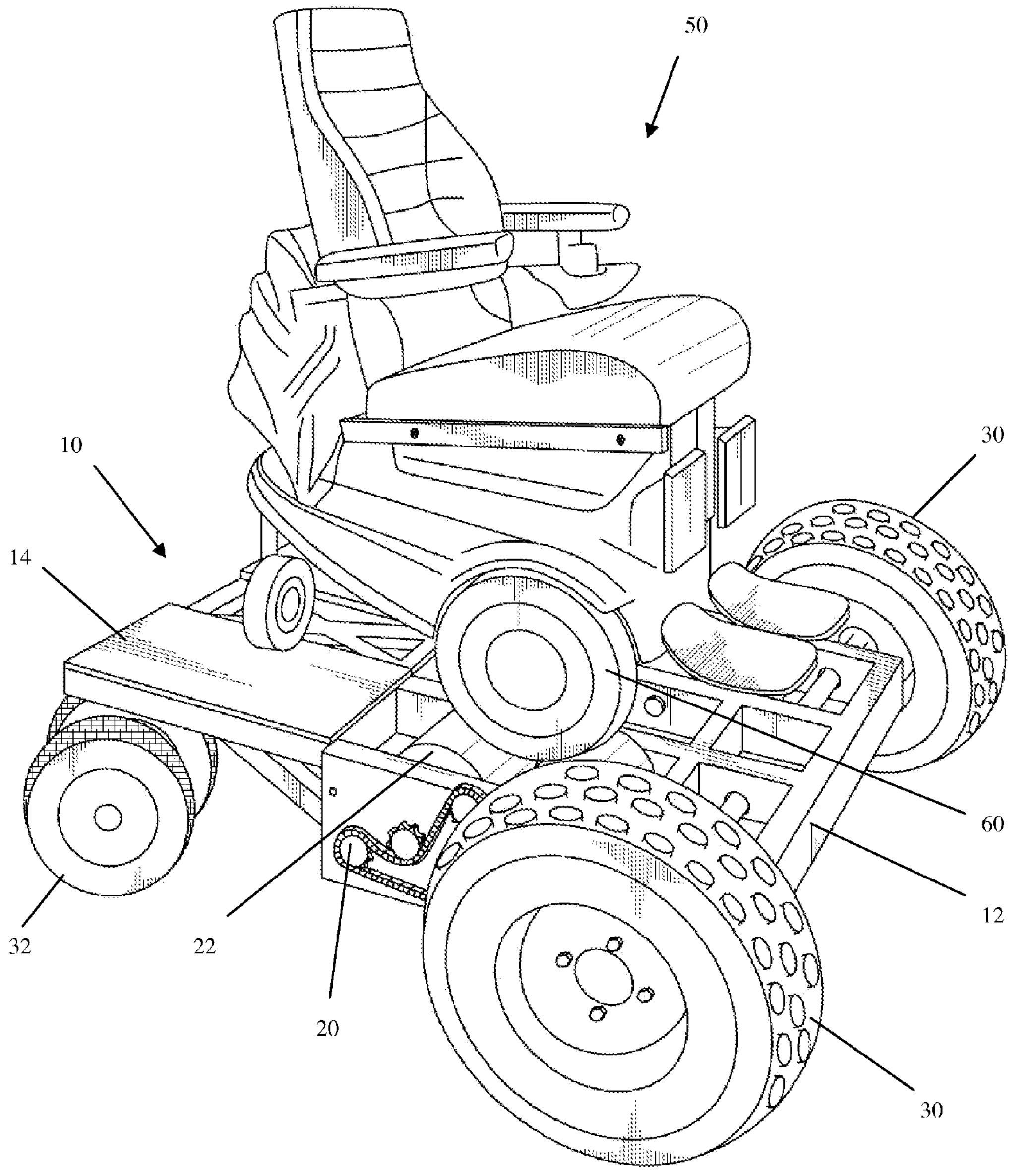
FIG. 2 is a perspective view of an embodiment of the wheelchair attachment.

Referring to FIG. 2, there is shown the wheelchair attachment 10 of the embodiment in FIG. 1 wherein the wheelchair attachment is supporting a motorized wheelchair 50 mounted thereon. One of the two drive wheels 60 of the motorized wheelchair 50 is visible in FIG. 2. The drive wheel 60 sits in the depression between the adjacent rollers.

Figure 3:
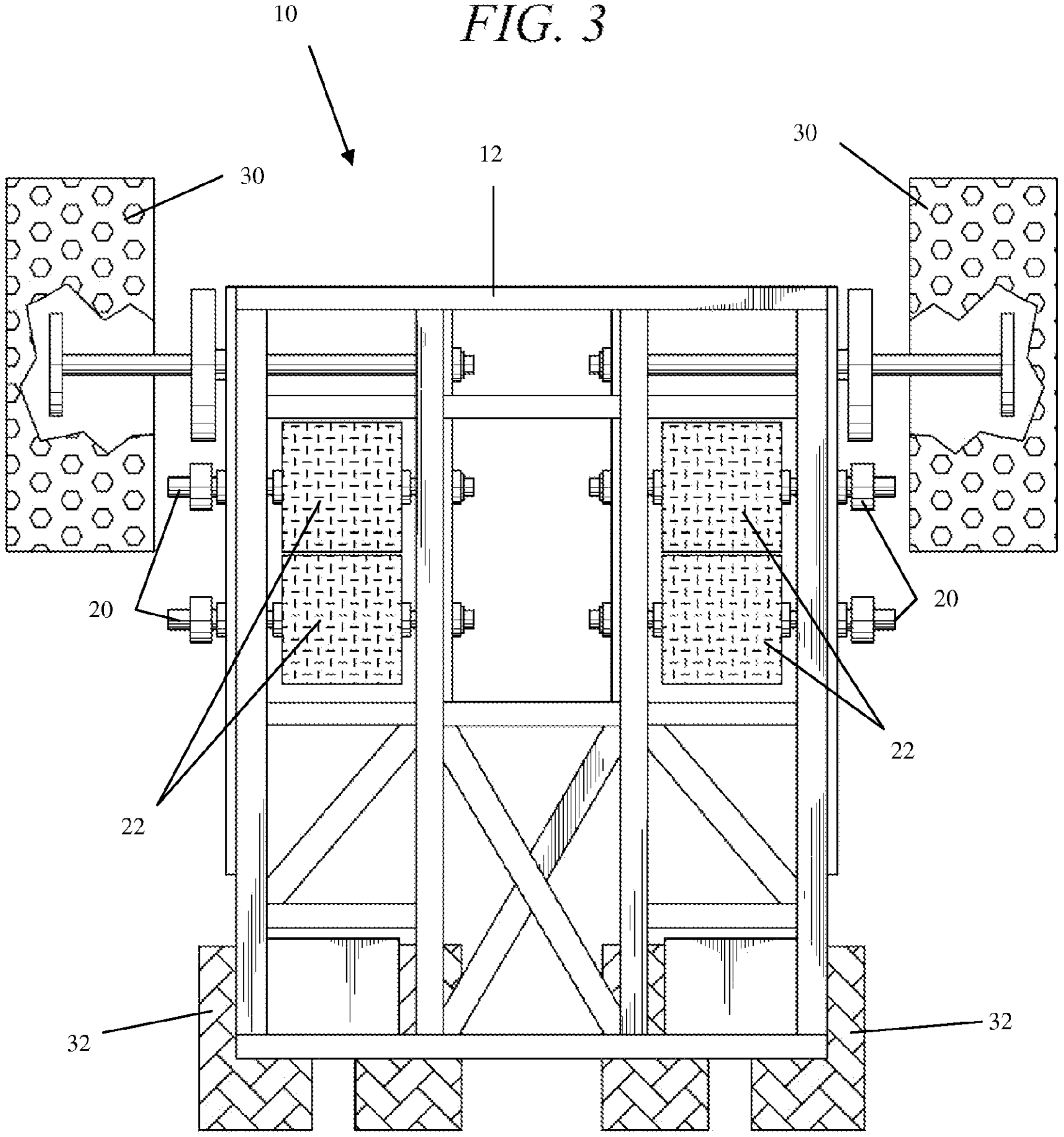
FIG. 3 is a top plan view of an embodiment of the wheelchair attachment.

Referring to FIG. 3, there is shown a top plan view of the wheelchair attachment. A portion of the platform (i.e. the top cover plates) upon which the rear wheels of the motorized wheelchair would sit is removed in the drawing to show the auxiliary wheels 32 arranged beneath the platform. Additionally, the oversized wheels 30 are presented in cut-away to reveal the axle linking the oversized wheels 30 to the platform. Lastly, the linkage between the drive units 20 and the oversized wheels has been removed to show the underlying structure. (The linkage 26, in the form of a chain, is partially visible in FIG. 4. See also FIGS. 1 and 2.) The rollers 22 of each drive unit 20 are visible, with each roller rotating about the axis of rotation created by the axle passing through their center. It is found advantageous to include a textured surface on the roller to ensure that the drive wheels on the motorized wheelchair are able to optimally grip the rollers as the drive wheels turn.

Figure 4:
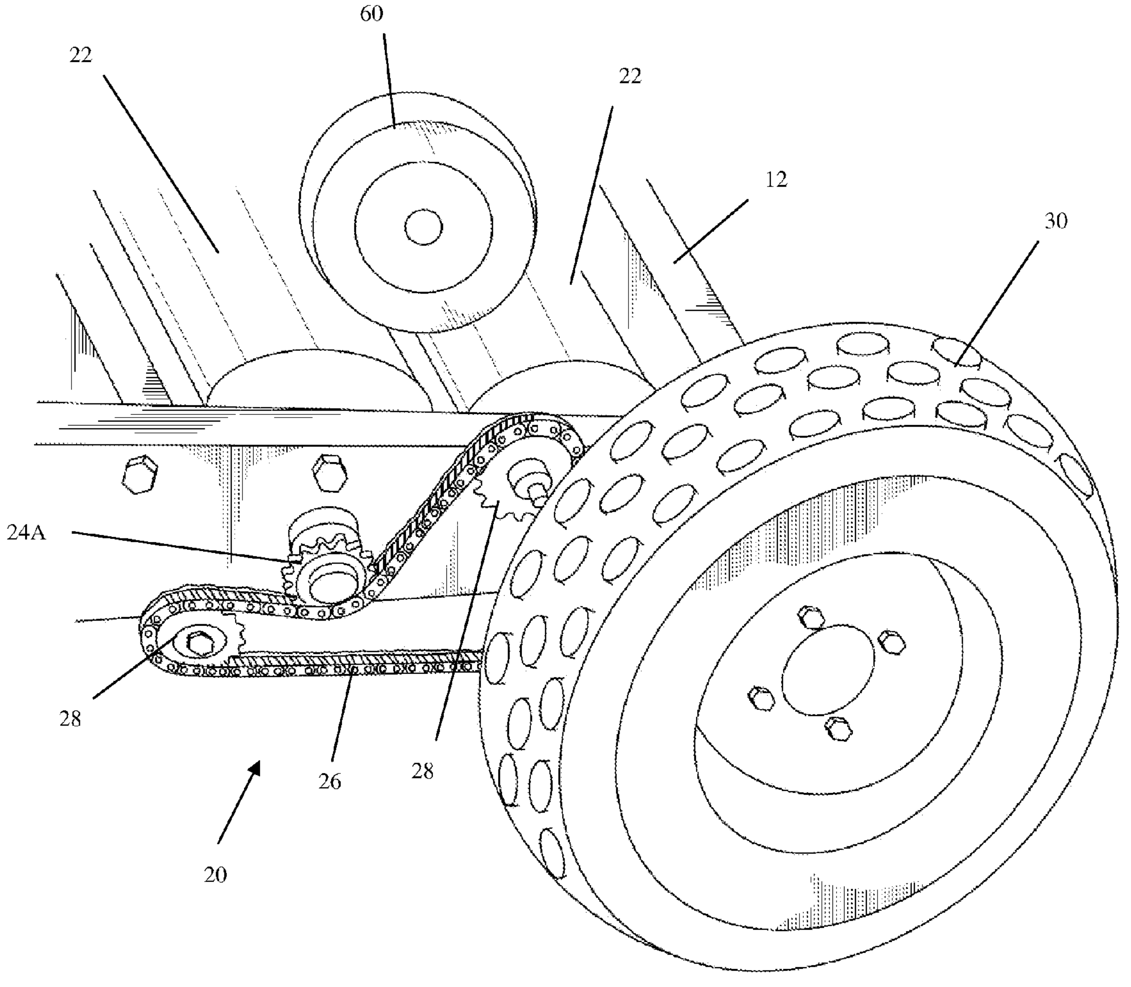
FIG. 4 is a partial view of an embodiment of the wheelchair attachment showing a drive unit.
Figure 5:
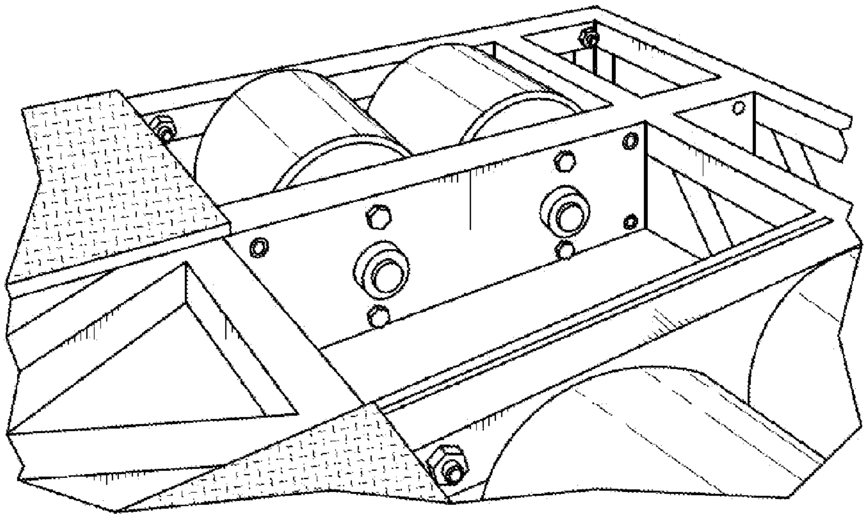
FIG. 5 is a perspective view of a set of rollers of a drive unit of an embodiment of the wheelchair attachment.
Figure 6:
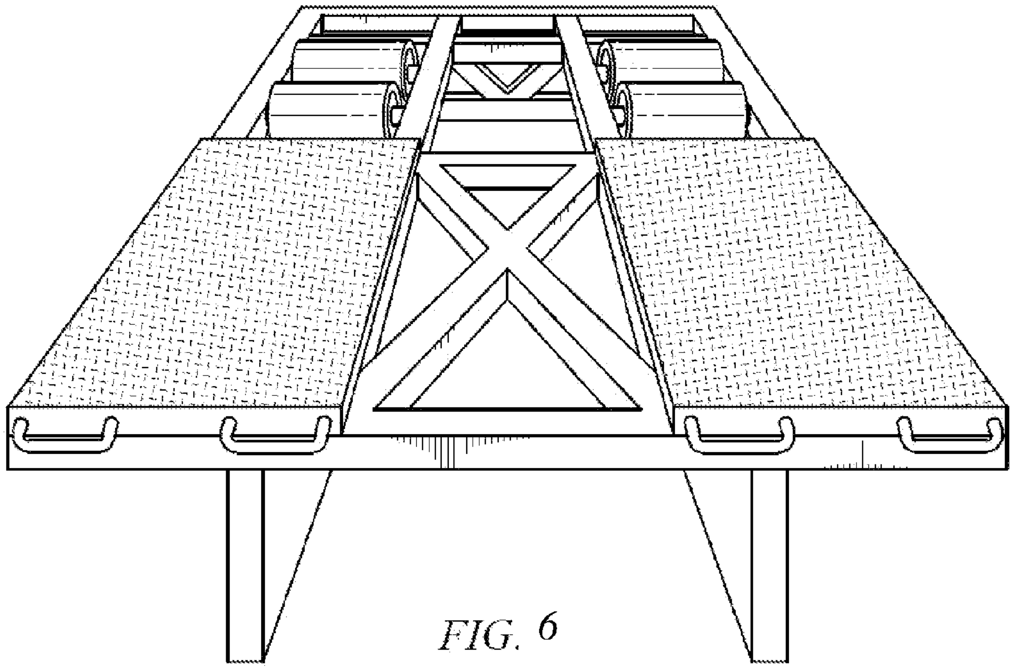
FIG. 6 is a perspective view of an embodiment of the wheelchair attachment.
Figure 7:
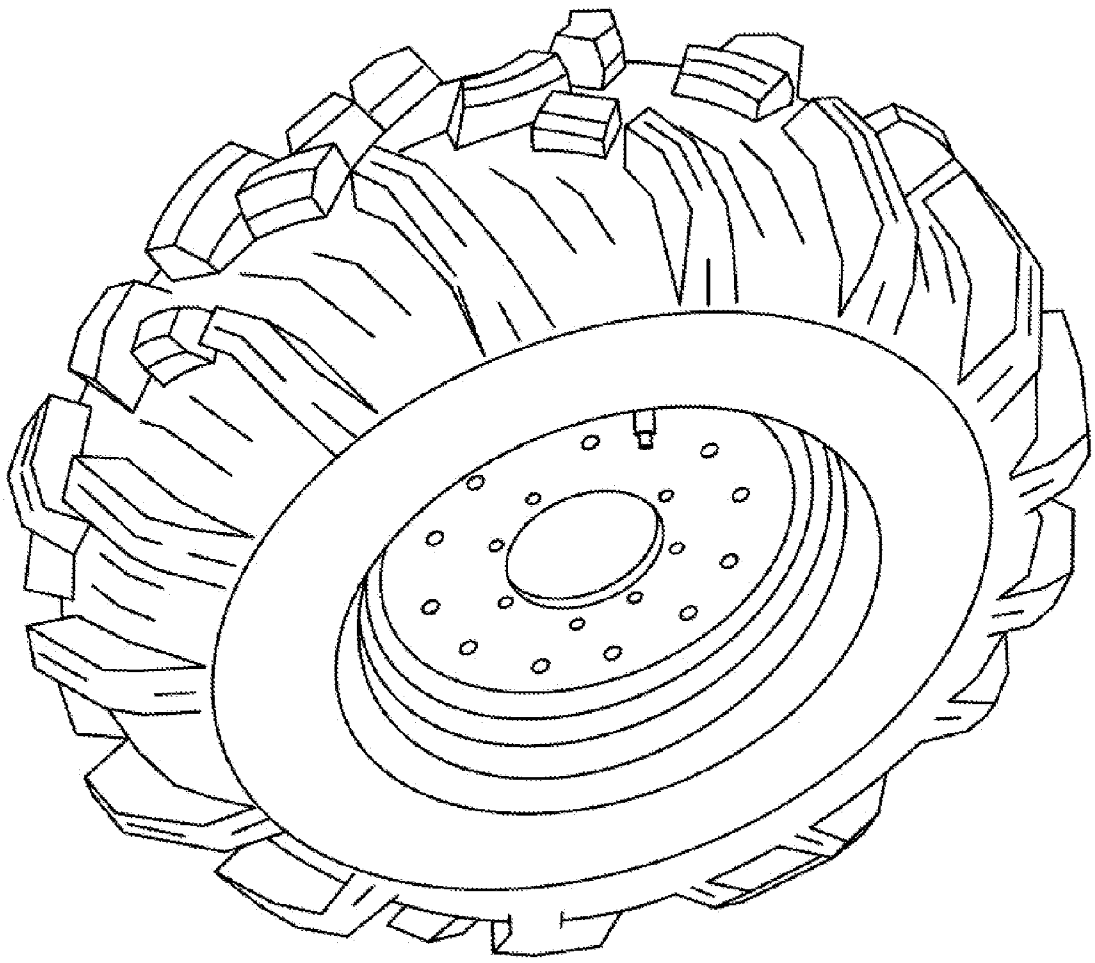
FIG. 7 is a perspective view of an oversized wheel of an embodiment of the wheelchair attachment.
Figure 8:
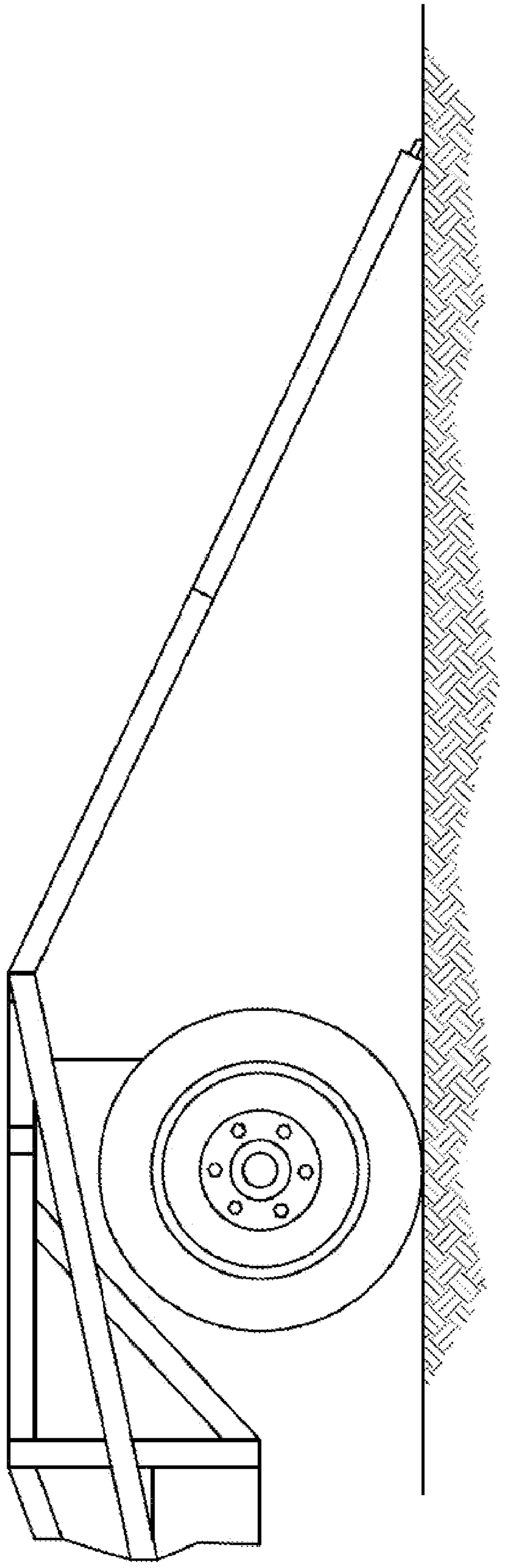
FIG. 8 is a side elevation view of a ramp of an embodiment of the wheelchair attachment.

Referring to FIG. 4, there is shown the drive unit 20 of an embodiment of the wheelchair attachment 10. A drive wheel 60 of the motorized wheel chair is shown sitting in the depression between a pair of adjacent rollers 22. Each roller has an axle passing through its center and terminating in the gear 24A. The gear 24A of the rear roller in the drive unit is shown in FIG. 4, while the forward gear is obscured by the wheel. The drive unit 20 uses the power supplied from a wheelchair, such as an electric wheelchair, to turn large off-road tires which thereby gives the user the opportunity to go over rough terrain. The wheelchair wheels interface with rollers which have a chain and sprocket attached which power the off-road wheels.

The drive unit includes a linkage 26 to transmit rotational force from the rollers, through the remainder of the drive unit, and to the oversize wheels. The linkage 26 in the embodiment shown in FIG. 4 is provided by a chain. Also visible are a pair of gears 28 supporting the extent of the linkage 26.

A user sits in the motorized wheelchair 50 and operates the chair in a manner analogous to that in the absence of the attachment. To move in a straight line, the user activates the wheelchair causing both of the drive wheels 60 to rotate at the same speed. This in turn results in rotation of the rollers 22 of the drive unit 20 at a common speed. Rotation of the rollers of the drive unit results in rotation of the oversized wheels of the wheelchair attachment. As can be seen on the drawings, each oversized wheel has its own drive unit. Thus, turning the wheelchair attachment can be accomplished by the differential rotation of one drive unit relative to another drive unit.

The frame for the platform 12 is constructed using 6061 aluminum square tubing to create a strong and relatively lightweight base to support all other components, including the wheelchair and user. The frame, when viewed from the top, is in the shape of a rectangle. When viewed from the side, the frame takes on a unique shape. The tapered end of the frame from side view is meant to allow the oversized castor wheels to be able to fit comfortably, maneuver with ease, and for so we could achieve the desired clearance.

The cross bracing within the frame provides structural integrity and flexural rigidity. The weight of the electric wheelchair reaches in excess of 250 lbs. In an initial embodiment the wheelchair was designed to support a user of about 180 lbs. Using braces provides confidence that the frame will be able to hold this 430 lb load with ease and minimal strain.

The final part of the frame assembly is the plates, used to secure the drive shafts, hold the bearings, or even roll a wheelchair up onto the frame. The top cover plates for the rear section of the frame were constructed of 6061-T651 Aluminum plating 0.25" thick. The bearing plates were machined from the same Aluminum, but 0.5" thick (FIG. 3). The bearing plates had to be thicker to be able to comfortably house the bearings and support the weight of the frame, wheelchair and user (FIG. 4).

The drive system was designed to be simple, yet effective. By not adding motors or any electric parts, the risk of failure is minimized and maintenance is decreased, giving it longer operational life. Power is transferred to the wheelchair attachment through the rollers which are in contact with the electric wheelchair's drive wheels. The rollers are connected to steel shafts. The steel shafts are mated to sprockets located on the outside of the frame, four sprockets, one for each roller. The sprockets drive a corrosion resistant roller chain (ANSI #40) around idler sprockets and the sprockets that control the drive wheels of the wheelchair attachment. It is essential to mention here that each drive wheel of the wheelchair attachment operates independently of the other, exactly like the system of the electric wheelchair. This independent drive system enables turning and steering with only the input into the electric wheelchair, further simplifying the setup.

The rollers serve as a contact point between the wheelchair attachment and the electric wheelchair power. The design of the rollers, along with all other gear train components included, makes the gearing ratio nearly 4:1. Quarter inch 6061-T651 aluminum plating was rounded to make each roller. This approach makes certain that the rollers can handle the torque load put on them. Finally, the rollers were coated with grip tape to provide more friction between them and the wheelchair drive wheels (See FIG. 3).

Steel was used for the drive shafts. Strength, durability, and resistance to cyclic fatigue separated steel from all the others and were the reasons it was chosen for the drive shafts. The 6 shafts were fit into 12 double sealed deep groove radial ball bearings. Sealed bearings were selected because the wheelchair attachment is meant to be taken off road.

The front/drive tires chosen were 24" off road use tires with an deep tread pattern. The rear 10" castor wheels are heavy duty and more than sufficient to hold the load of the frame, wheelchair, and user. The bigger castors were desired for the same reason the front tires were chosen as oversized; i.e. to be able to roll over sand, grass, or any other environment without getting stuck. The width of the frame and tires prevent rollover at reasonable inclines. The clearance, from ground to frame, of the wheelchair attachment was nine inches. This number was more than sufficient in testing to overcome typically encountered object on rough terrain. Speed was not a concern high on the priorities list. The top speed is projected at 2 mph on level and flat surfaces, due to gearing.

No modifications would have to be made to the electric wheelchair in order to be able to connect to the wheelchair attachment. One of the goals set in the project design was to make this an accessory that required no alteration to the wheelchair itself and possibly be configured to fit a variety of electric wheelchairs on the market today. By simply adjusting the locking mechanism with L brackets (located between the rollers in the frame) the wheelchair attachment can be adapted to many electric wheelchair models.

Figure 9:
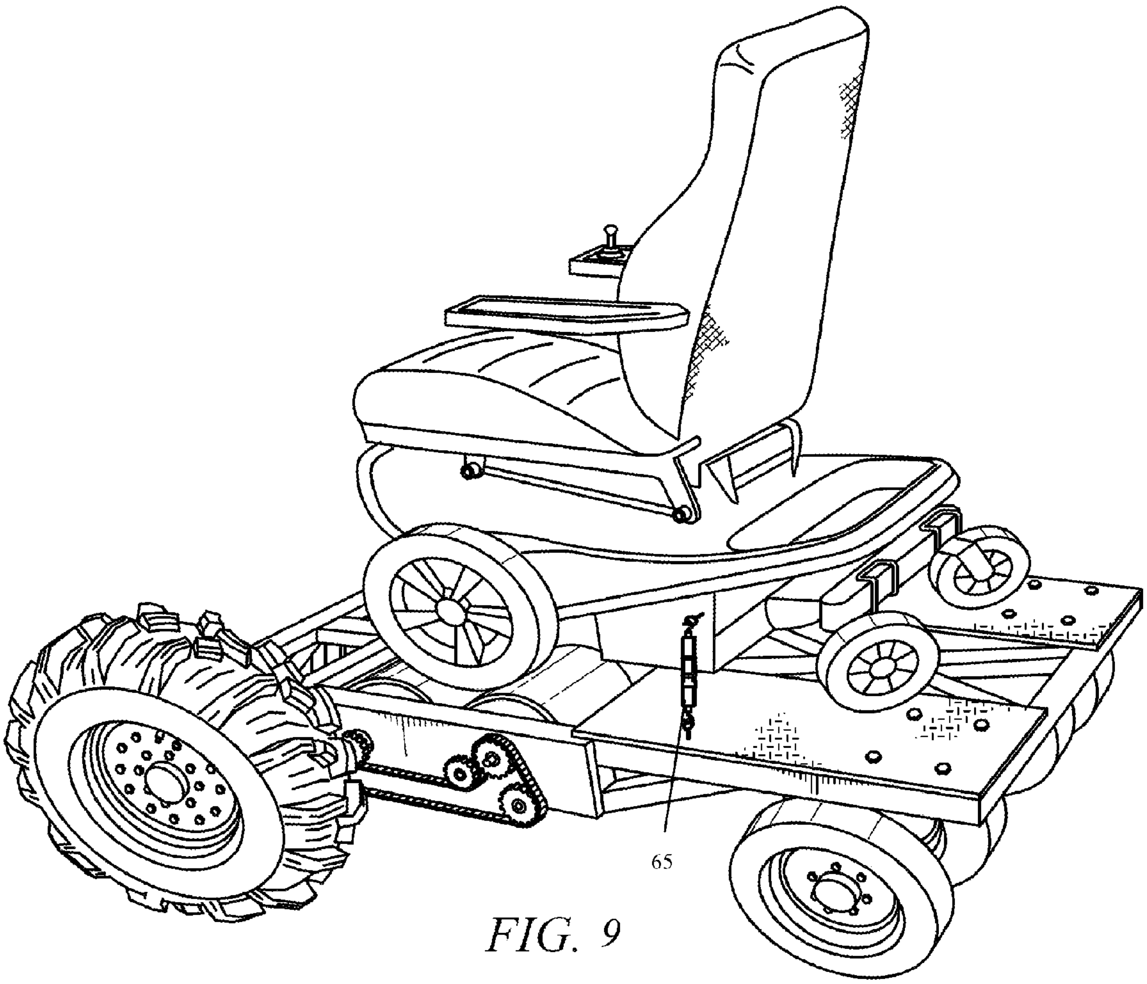
FIG. 9 is a perspective view of an embodiment of the wheelchair attachment.

The design can include an anchoring unit to securely affix a wheelchair to the wheelchair attachment. Such an anchor would add to the stability of the design by preventing the wheelchair from becoming dislodged when sudden forces such as bumps are encountered. In an additional embodiment, depicted in FIG. 9, anchoring unit 65 is a cargo strap that is attached to the wheelchair and the platform. Alternatively, the anchoring unit may be a wheelchair restraining device as disclosed in U.S. Pat. No. 4,690,364.

Figure 10:
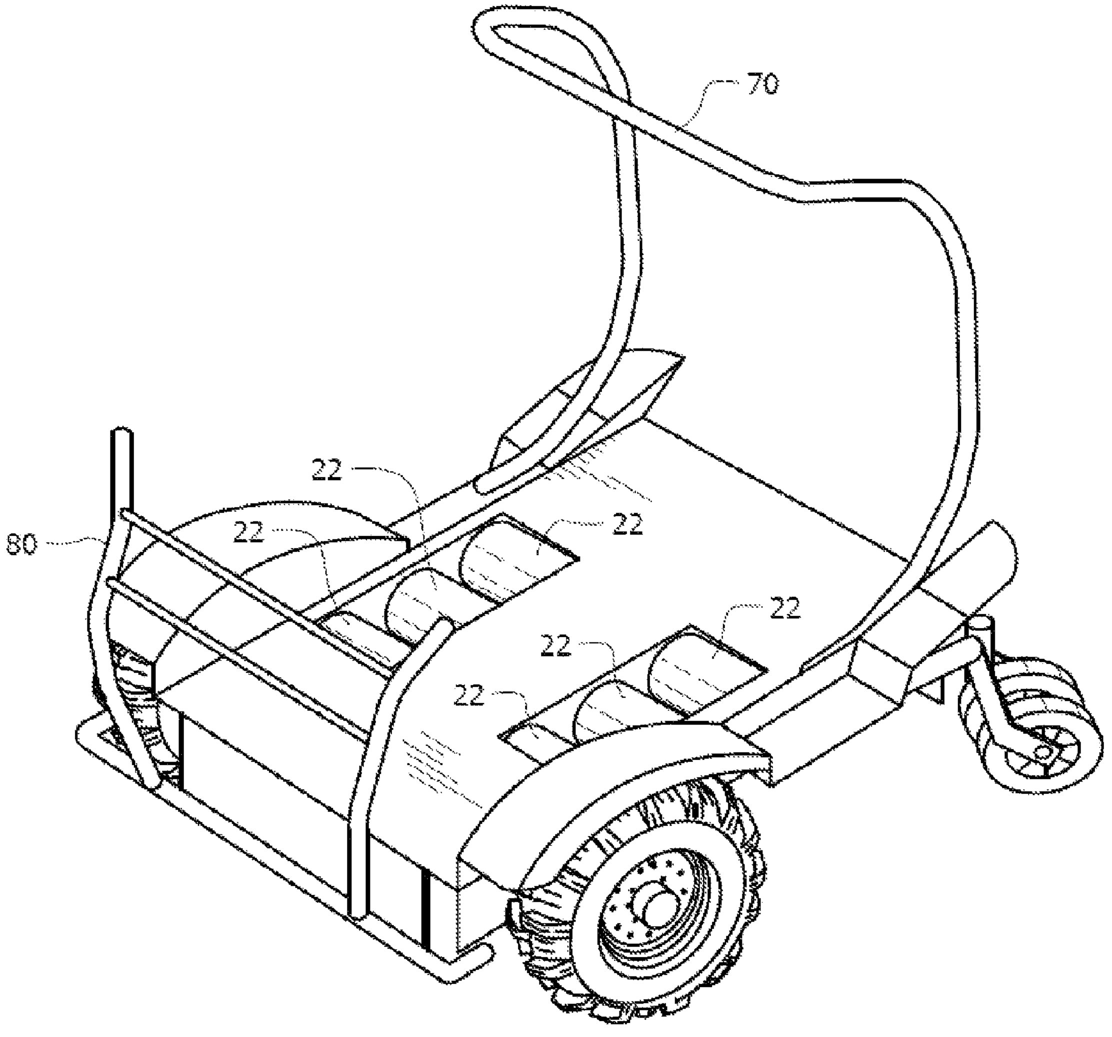
FIG. 10 is a perspective view of an embodiment of the wheelchair attachment.
Figure 11:
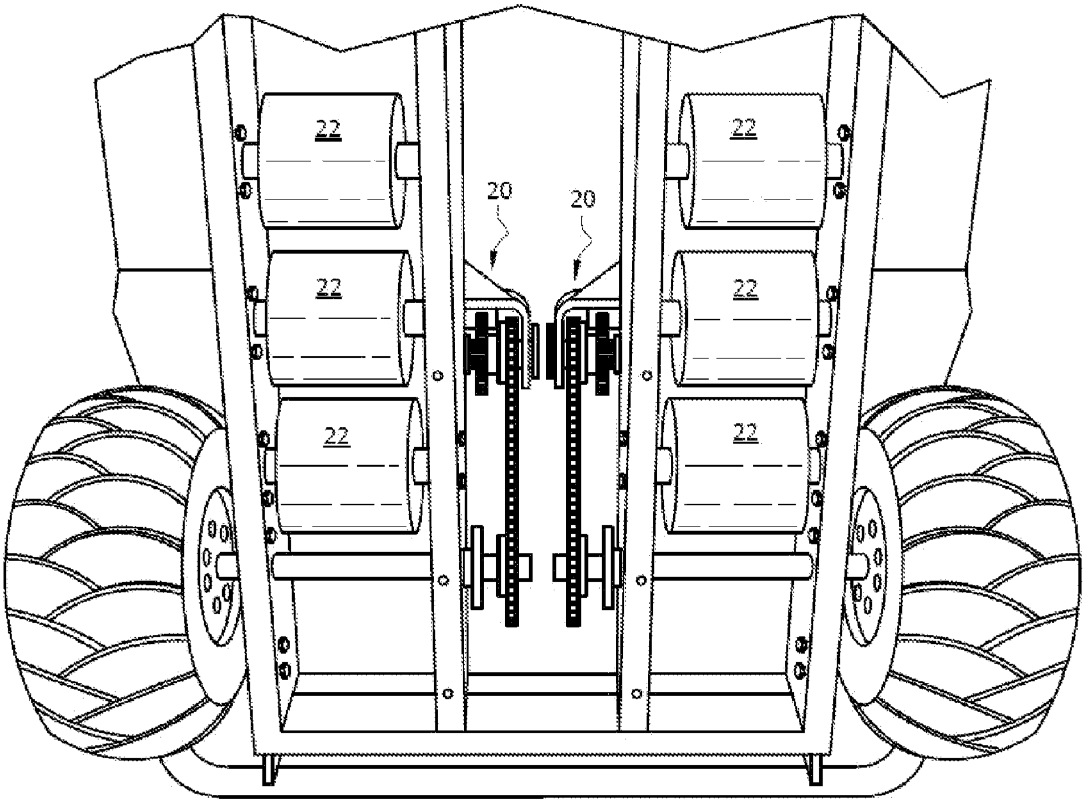
FIG. 11 is a bottom view of an embodiment of the wheelchair attachment.

In a commercial embodiment, as depicted in FIGS. 10 and 11, the attachment includes three rollers 22. Each drive unit 20 is found in association with each oversize wheel. Each drive unit has three rollers 22, the three rollers of each drive unit are arranged parallel to one-another with reference to their axis of rotation and having a slight depression between the apex, or highpoint, of adjacent rollers. Multiple rollers are used to accommodate varying sized wheelchairs. In addition, the attachment includes a roll bar 70 and guard bar 80. The roll bar extends a distance beyond the height of an attached wheelchair and protects the wheelchair in the event of a rollover. The guard bar comprises two transverse bars connected via two horizontal bars. Although the guard bar is depicted at the front of the apparatus, it may similarly be disposed along the sides of the apparatus.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An apparatus for use with a motorized wheelchair, comprising:

a platform having a front and a rear portion capable of supporting a motorized wheelchair thereon;

a pair of oversized wheels attached to said platform at said front portion;

a pair of drive units, each of said drive units comprising at least two rollers rotatably mounted to said platform, wherein said at least two rollers are in independent rotatable communication with a respective one of said oversized wheels using a gear and linkage and wherein said at least two rollers are in independent rotatable communication with a respective drive wheel of said motorized wheelchair, whereby rotation of said respective drive wheel of said motorized wheelchair causes rotation of at least two rollers resulting in rotation of said respective one of said oversized wheels;

at least one caster attached to said rear portion of said platform at a position behind said pair of oversized wheels, wherein said platform includes a cover plate above said at least one caster to provide support for a wheel of said wheelchair; and a roll bar affixed to said platform;

whereby said apparatus is controlled by varying said rotation of each of said oversized wheels.

2. An apparatus for use with a motorized wheelchair as in claim 1, wherein said oversized wheels are wider than said wheels of a conventional motorized wheelchair.

3. An apparatus for use with a motorized wheelchair as in claim 1, wherein said pair of oversized wheels have a diameter larger than the wheels of a conventional motorized wheelchair.

4. An apparatus for use with a motorized wheelchair as in claim 1, further comprising:

an integrated ramp adjustably attached to said platform, said ramp having a first stowed position and a second unstowed position.

5. An apparatus for use with a motorized wheelchair as in claim 1, further comprising:

an anchoring unit to securely affix said wheelchair to said platform.

6. An apparatus for use with a motorized wheelchair, comprising:

a platform having a front and a rear portion capable of supporting a motorized wheelchair thereon;

a pair of oversized wheels attached to said platform at said front portion;

a pair of drive units, each of said drive units comprising at least two rollers rotatably mounted to said platform, wherein said at least two rollers are in independent rotatable communication with a respective one of said oversized wheels using a gear and linkage and wherein said at least two rollers are in independent rotatable communication with a respective drive wheel of said motorized wheelchair, whereby rotation of said respective drive wheel of said motorized wheelchair causes rotation of at least two rollers resulting in rotation of said respective one of said oversized wheels;

at least one caster attached to said rear portion of said platform at a position behind said pair of oversized wheels, wherein said platform includes a cover plate above said at least one caster to provide support for a wheel of said wheelchair; and a guard bar affixed to said platform;

whereby said apparatus is controlled by varying said rotation of each of said oversized wheels.

7. An apparatus for use with a motorized wheelchair as in claim 6, wherein said oversized wheels are wider than said wheels of a conventional motorized wheelchair.

8. An apparatus for use with a motorized wheelchair as in claim 6, wherein said pair of oversized wheels have a diameter larger than the wheels of a conventional motorized wheelchair.

9. An apparatus for use with a motorized wheelchair as in claim 6, further comprising:

an integrated ramp adjustably attached to said platform, said ramp having a first stowed position and a second unstowed position.

10. An apparatus for use with a motorized wheelchair as in claim 6, further comprising:

an anchoring unit to securely affix said wheelchair to said platform.

* * * * *